F. HICKMAN.
Rubber Dam-Clamps.

No. 158,376. Patented Jan. 5, 1875.

WITNESSES
Harry King
Wm J Peyton

INVENTOR
Francis Hickman
By his Attorney
W. W. Baldwin

UNITED STATES PATENT OFFICE.

FRANCIS HICKMAN, OF READING, ASSIGNOR TO SAMUEL S. WHITE, OF PHILADELPHIA, PENNSYLVANIA.

IMPROVEMENT IN RUBBER-DAM CLAMPS.

Specification forming part of Letters Patent No. 158,376, dated January 5, 1875; application filed December 19, 1874.

CASE B.

*To all whom it may concern:*

Be it known that I, FRANCIS HICKMAN, of Reading, in the county of Berks and State of Pennsylvania, have invented an Improved Rubber-Dam Clamp, of which the following is a specification:

The method heretofore adopted of applying a rubber dam to the tooth is to perforate the rubber, force it down over and around the tooth, and hold it down by means of a spring-clamp grasping the sides of the tooth. The object of my invention is to expedite this operation while doing it in a better way. This I do by constructing a rubber-dam clamp with the recessed jaws to receive and carry down the rubber dam around the tooth.

Figure 1:
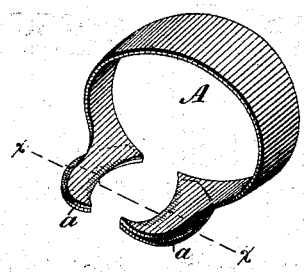
Figure 2:
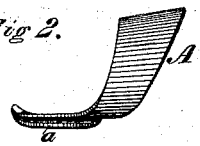
Figure 3:
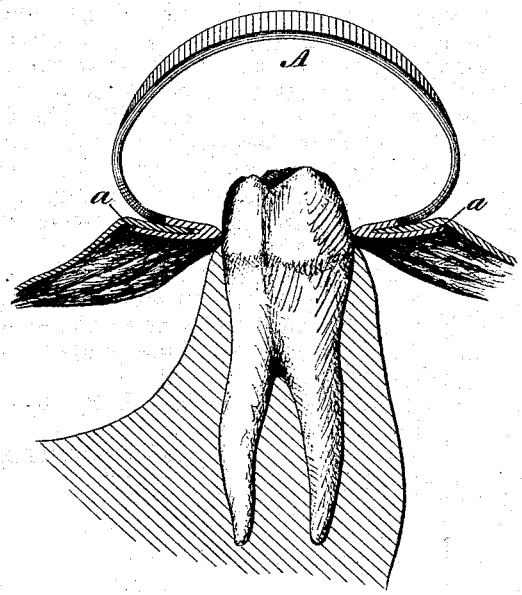
Figure 4:
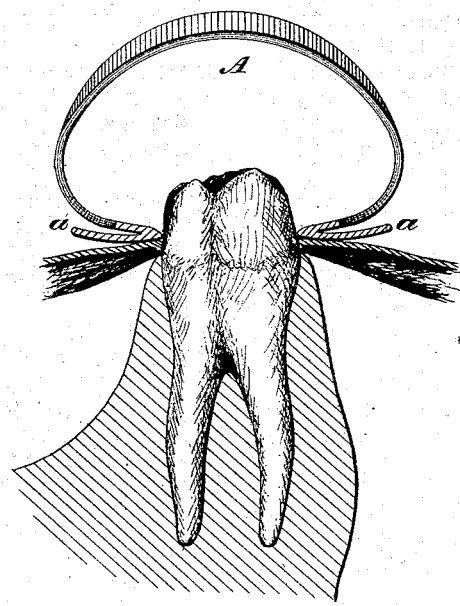

In the accompanying drawings, Figure 1 shows a view, in perspective, of one form of my improved clamp; Fig. 2, a side view thereof. Fig. 3 shows the rubber as seized by the clamp and carried down around the tooth; while Fig. 4 shows the rubber as released from the clamp, but still held down by it, closely hugging the tooth.

Each prong of the clamp A is provided with an extra base or flange, *a*, leaving a space between the extra flange and the prong, so as to form a recess or clamp, so that when inserted through the perforations in the rubber in the usual way the edges of the rubber, owing to the opening, may be held by these jaws, as shown in Fig. 3. The clamp and rubber are then pressed upon the tooth, in the usual way. When in proper position the cloth is pulled out of the recessed jaws in the clamp, and pressed down below them, so as closely to embrace the tooth, as shown in Fig. 4.

Practice has demonstrated the efficiency of this improvement.

I claim—

A rubber-dam clamp constructed, substantially as hereinbefore set forth, with recessed jaws to receive and carry the rubber down over the tooth.

In testimony whereof I have hereunto subscribed my name.

FRANCIS HICKMAN.

Witnesses:
G. G. HICKMAN,
CASS HOLTON.